Figure 1:
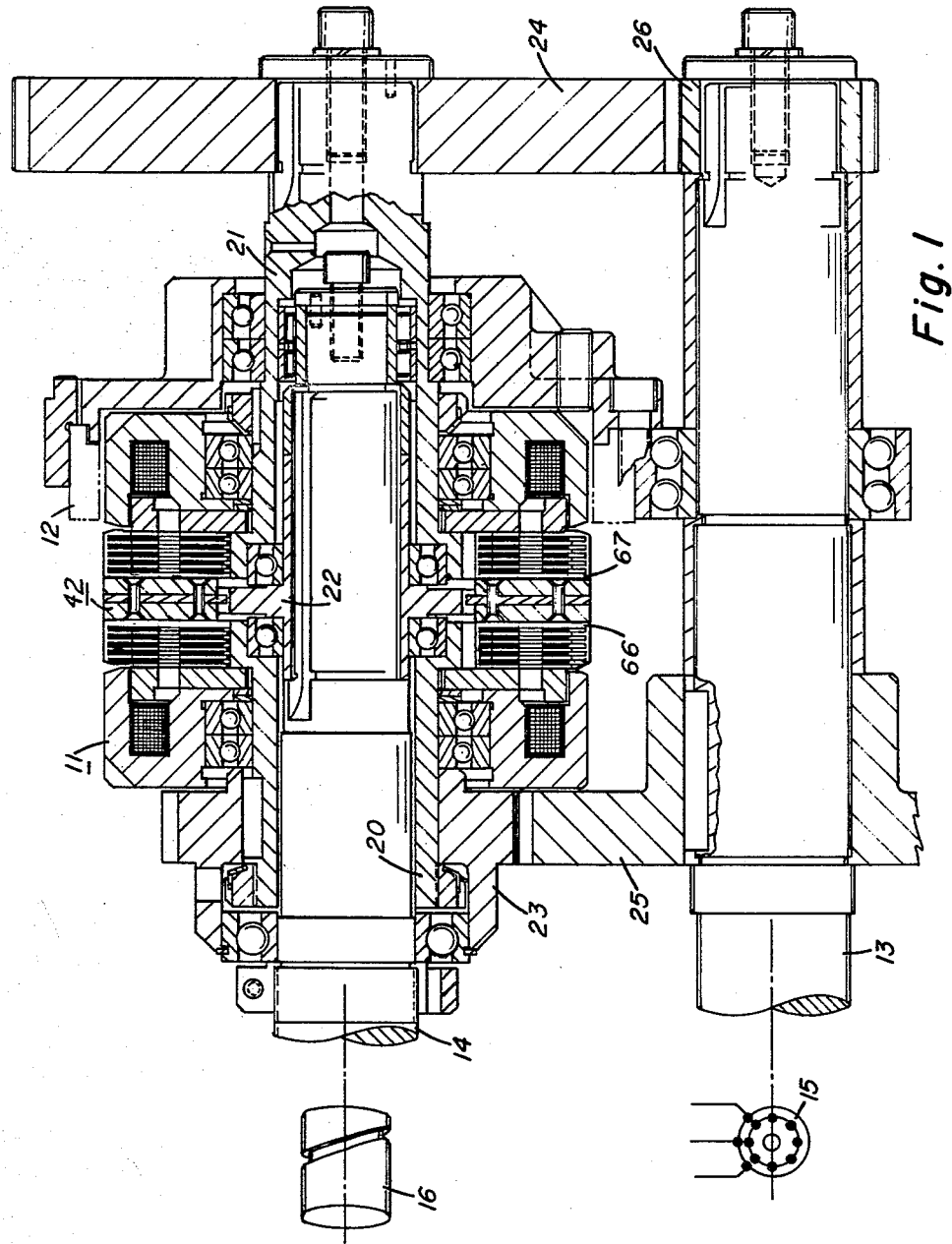

Feb. 16, 1965   K. P. SCHUBERT   3,169,617
ELECTROMAGNETICALLY OPERATED DUAL CLUTCH DRIVE
Filed June 19, 1961   2 Sheets-Sheet 2

INVENTOR.
KARL P. SCHUBERT

United States Patent Office

3,169,617
Patented Feb. 16, 1965

3,169,617
ELECTROMAGNETICALLY OPERATED DUAL
CLUTCH DRIVE
Karl P. Schubert, Cleveland Heights, Ohio, assignor to
The National Acme Company, a corporation of Ohio
Filed June 19, 1961, Ser. No. 118,013
5 Claims. (Cl. 192—84)

The invention relates in general to clutch drives and more particularly to two opposed clutches connected for alternative engagement.

The clutch drive of the invention may be used in many locations such as those wherein a rapid change from one drive condition to another of a different speed is required, for example, in a machine tool drive. Generally, the two-speed clutch drive comprises input and output means one of which includes first and second rotary members and the other of which includes a third rotary member. First and second clutches each include first and second engageable clutch parts with the first clutch parts of each of the first and second clutches rotationally fixed to the first and second rotary members, respectively, and the second clutch parts are rotationally fixed relative to the third rotary member. The first and second clutches also includes first and second movable magnetic members, respectively, movable toward the respective clutch to effect engagement of the same. Means is provided linking the first and second movable magnetic members for simultaneous movements relative to the respective clutches, and first and second fixed clutch coils act respectively on the first and second magnetic members whereby the first coil may establish a flux to move the first magnetic member to urge the first clutch toward engagement and the substantially simultaneous de-energization of the first coil and energization of the second coil establishes a flux from the second coil to move the second magnetic member to urge the second clutch toward engagement and to aid rapid dis-engagement of the first clutch.

In many clutch drive applications it is desirable to have first and second different speeds and to be able to rapidly change from one to another. In electrically or electromagically operated clutches, there is a flux established by the coil and upon de-energization of the coil this flux takes a finite time to be dissipated determined by the self-inductance of the coil. Until this flux is dissipated, the clutch may not dis-engage. Often this may take one or two seconds for clutches of only a few horsepower rating. This long delay may not be tolerable in machine tool drives, for example, wherein the entire cycle of operation, including high speed and low speed, may be only of ten seconds duration and machining operations must be carried out during the low speed operation with the high speed operation used during idle or non-machining portions of the cycle.

Accordingly, an object of the invention is to reduce the total machine cycle time of a machine tool.

Another object of the invention is to provide a dual clutch drive for high and low speeds, with a minimum time for shifting between speeds.

Another object of the invention is to provide a dual clutch drive for high and low speeds wherein parts of two clutches are interlinked so that engagement of one clutch aids rapid dis-engagement of the other clutch.

Another object of the invention is to provide dual magnetic clutches interlinked mechanically but not magnetically so as to provide two separate magnetic circuits and energization of one clutch and simultaneous de-energization of the other clutch effects rapid dis-engagement of the previously energized clutch.

Figure 2:
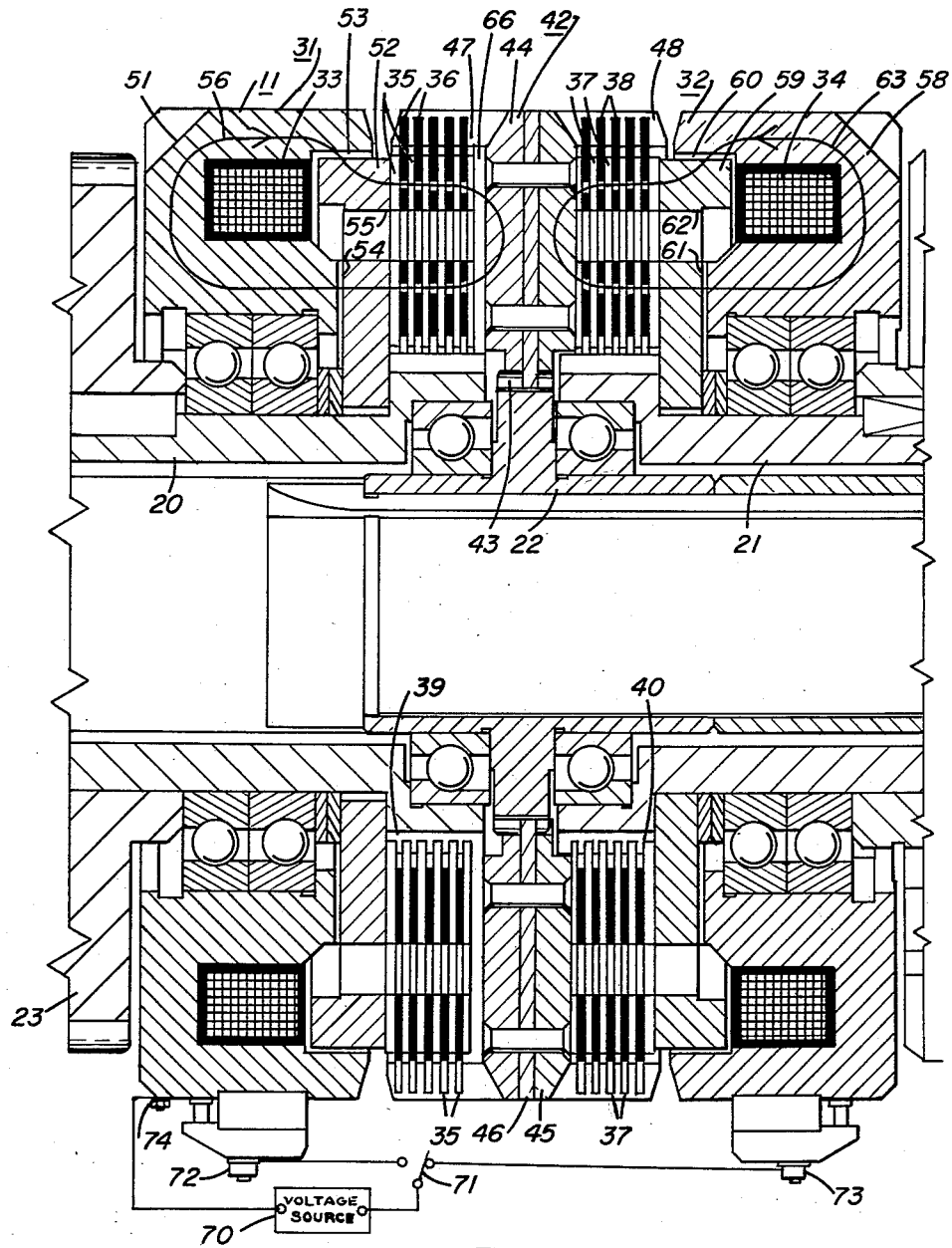

Other objects and a fuller understanding of this invention may be had by referring to the following description and claims, taken in conjunction with the accompanying drawings, in which:

FIGURE 1 is a longitudinal sectional view of a dual clutch drive to a load shown as a machine tool cam drum; and FIGURE 2 is an enlarged partial view of the dual clutch drive of FIGURE 1.

The figures of the drawing show a dual clutch drive 11 embodying the invention. This clutch drive is shown as embodied in a machine tool merely as one pertinent use for the invention. The machine tool has a frame 12 which journals an input shaft 13 and an output shaft 14. The input shaft 13 is driven from any suitable source such as a constant speed electric motor 15. The output shaft 14 drives any suitable load and in this case the load is shown as a cam drum to drive machine tool slides and the like of the machine tool.

The output shaft 14 journals a first input sleeves 20 and a second input sleeve 21. These sleeves are disposed near opposite ends of the output shaft 14 and an output sleeve 22 is disposed between the two input sleeves and is fixed relative to the output shaft 14. A first input gear or a high speed gear 23 is fixed to the first input sleeve 20. A second input or low speed gear 24 is fixed to the second input sleeve 21. A gear 25 fixed on the input shaft 13 drives the first input gear 23 at high speed and a gear train is also provided to drive the second input gear 24. This gear train is shown as being a pinion 26 driven from the input shaft 13. Thus, both input gears 23 and 24 rotate in the same direction but at different speeds. The second input gear 24 may be considered a feed gear for slow feed speeds of the cam drum 16. The first and second input sleeves 20 and 21 may be considered first and second rotary members, respectively, and the clutch output sleeve 22 may be considered a central or third rotary member.

The dual clutch drive includes first and second clutches 31 and 32, respectively. FIGURE 2 shows these clutches in greater detail and the first clutch includes a first clutch coil 33 and the second clutch includes a second clutch coil 34, both of which are fixed against rotation. Each clutch is a multiple disc clutch and the first clutch 31 includes a first set of clutch discs 35 and a second set of clutch discs 36. Similarly, the second clutch 32 includes a first set of clutch discs 37 and a second set of clutch discs 38. The first input sleeve 20 includes a series of splines 39 for splined engagement with the first set of clutches discs 35, so that these discs are rotationally fixed, yet may axially slide relative to the first input sleeve 20. The second input sleeve 21 is axially splined at 40 for splined engagement with the first set of clutch discs 37. A composite shifter plate 42 is splined at 43 to the clutch output sleeve 22. This permits axial movement of the composite shifter plate 42 which includes first and second magnetic disc members 44 and 45 separated by a non-magnetic disc member 46. The first magnetic disc 44 fixedly carries axial fingers 47 for an axially splined connection with the second set of clutch discs 36. Similarly, the second magnetic member 45 carries axial fingers 48 for splined connection with the second set of clutch discs 38. These fingers establish rotation of the second sets of clutch discs 36 and 38 with the composite shifter plate yet permit axial sliding movements thereon. The first and second sets of clutch discs may be considered first and second clutch parts of the respective clutches.

A stator 51 cooperates with the first coil 33 to conduct the flux of this coil through the clutch discs 35 and 36 and the magnetic disc 44. A magnetic rotor 52 has a radial air gap 53 and an axial air gap 54 with the outer and inner portions of the magnetic stator 51. This magnetic rotor 52 has a series of arcuate slots 55 forcing a majority of the flux from the coil 33 to follow a flux path 56. This flux path goes through the magnetic stator 51, across the outer air gap 53, through the outer part of the rotor 52, through the clutch discs 35 and 36, the magnetic disc 44 and returns through the lower part of the clutch discs 35 and 36, the rotor 52 and air gap 54 to the stator 51. For this purpose the clutch discs are of steel or other magnetic material.

The clutch coil 34 is partially surrounded by a magnetic stator 58. A magnetic rotor 59 has an outer radial air gap 60 with the stator 58 and an inner axial air gap 61 therewith. This rotor 59 has arcuate slots 62 forcing flux from the coil 34 to follow a flux path 63. This flux path is similar to the flux path 56 for the first clutch 31.

FIGURE 1 shows the composite shifter plate 42 as being centrally located and, thus, establishing a first axial air gap 66 adjacent the clutch discs of the first clutch 31 and establishing a second axial air gap 67 adjacent the clutch discs of the second clutch 32. FIGURE 2 shows the condition existing wherein the second clutch 32 is engaged and, consequently, the composite shifter plate 42 has moved to the right to eliminate the second axial air gap 67 with a consequent doubling of the size of the first axial air gap 66.

FIGURE 2 shows a voltage source 70 connected by a double throw switch 71 to terminals 72 or 73 on the clutches 31 and 32, respectively, and with a return circuit provided by a return terminal 74. The switch 71 is shown as energizing the second clutch 32 and this would establish the shifter plate 42 to the right as shown in FIGURE 2. This is because the flux established by the coil 34 in the flux path 63 links the magnetic disc 45 to urge it to the right to cause frictional engagement of the sets of clutch discs 37 and 38. Accordingly, the low speed drive will be engaged from the second input gear 24 to the output shaft 14. If now the switch 71 is thrown to the left to energize clutch 31, this will also substantially simultaneously de-energize the second clutch 32. Normally, it would take a finite time such as one-half or one second for the flux to collapse in the flux path 63 due to the self-inductance of the coil 34. As long as flux continued to thread through the flux path 63 this would be a constant urging of the magnetic disc 45 toward the clutch discs 37 and 38, thus, retaining this clutch in engagement, however, the magnetic disc 45 is mechanically linked to the magnetic disc 44 and these magnetic discs are thus connected for movement in opposition relative to the first and second clutches 31 and 32. Thus, the energization of the coil 33 establishes flux in the flux path 56 to urge the magnetic disc 44 toward the left to engage the first clutch 31. This aids the rapid disengagement of the second clutch 32 and the total shifting time may be in the order of 1/10 of a second. In a machine tool drive this may be quite important for reducing the total cycle time of the machine, and for establishing the exact point of engagement and disengagement of the clutches. The machine tool drive may be such that the cam drum is driven at high speed by engagement of the first clutch 31 during an idle portion or non-machining portion of the total machine tool cycle. This may be a rapid movement to bring the tools close to the point of actual machining a workpiece. Just before the tools engage the workpiece, the switch 71 acting as a limit switch is actuated to de-energize the first clutch 31 and energize the second or low speed clutch 32. This changes the drive from high speed to low speed in the order of 1/10 of a second and, thus, the machine tool drive is established for feed speeds of the machine tool during actual machining operations. If the changeover from high speed to low speed was done slowly, as in the prior art, then the exact instant of changeover from high speed to low speed could not accurately be determined. If this shifting to low speed was performed too slowly, then it would be possible that the idle or non-machining portion of the total machine tool cycle would be too long. Under this condition the tools in the machine tool could actually contact the workpieces under high speed conditions and this would damage the workpieces or the tools. With the present invention, the exact point of changeover from high speed to low speed can accurately be determined because of the rapidity of such clutch engagement and disengagement. This presents tool and workpiece damage. Thus, a one or two second delay in shifting from high speed to low speed is avoided.

The first and second input sleeves 20 and 21 are considered as first and second rotary members and the output sleeve 22 is considered as a central or third rotary member. Accordingly, it will be seen that there is an input means and an output means to the entire dual clutch drive with one of these input means and output means comprising first and second rotary members and the other of input and output means comprising the third rotary member. Accordingly, it will be noted that the input to the clutch drive could be at the third rotary member 22 with first and second outputs taken from the first and second rotary members 20 and 21.

The dual clutch drive of the present invention permits rapid changing of speeds from low speed to high speed and vice versa because of the magnetic separation of the two magnetic discs 44 and 45. Still further, these discs and the composite shifter plate 42 have a very low mass compared to the mass of the entire clutches and relative to the torque capacities of the clutches, and this low mass establishes a low inertia and, thus, aids the rapid shifting of the clutches.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A two-speed clutch drive, comprising in combination, a frame, input means and output means journaled on said frame, one of said means including first and second rotary members disposed on opposite sides of a central rotary member as the other of said means, first and second friction clutches each including first and second engageable clutch parts, means mounting said first clutch part of said first clutch rotationally fixed relative to said first rotary member, means mounting said first clutch part of said second clutch rotationally fixed relative to said second rotary member, means mounting said second clutch parts rotationally fixed and axially slidable relative to said central rotary member, said last named means comprising a composite shifter plate having first and second magnetic disc members on opposite sides of a non-magnetic plate, and first and second fixed clutch coils on opposite sides of said composite shifter plate, whereby flux from said first coil links said first magnetic disc plus said first clutch to urge same into frictional engagement, and whereby substantially simultaneous de-energization of said first coil and energization of said second coil establishes a flux path from said second coil linking said second magnetic disc plus said second clutch to axially move said composite shifter plate toward said second coil to engage said second clutch and to aid rapid disengagement of said first clutch.

2. A two-speed clutch drive, comprising in combination, a frame, input means and output means journaled on said frame, one of said means including first and second rotary members disposed on opposite sides of a central rotary member as the other of said means, first and second multiple disc clutches, each comprising first and second sets of discs, means mounting said first set of clutch discs of said first clutch rotationally fixed and axially slidable relative to said first rotary member, means mounting said first set of clutch discs of said second clutch rotationally fixed and axially slidable relative to said second rotary member, means mounting said second sets of clutch discs rotationally fixed and axially slidable relative to said central rotary member, said last named means comprising a composite shifter plate having first and second magnetic disc members on opposite sides of a non-magnetic plate, and first and second clutch coils fixed on said frame on opposite sides of said central rotary member, whereby flux from said first coil links said first magnetic disc plus the first and second sets of clutch discs of said first clutch to urge same into frictional engagement, and whereby substantially simultaneous de-energization of said first coil and energization of said second coil establishes a flux path from said second coil linking said second magnetic disc plus the first and second sets of clutch discs of said second clutch to axially move said composite shifter plate toward said second coil to engage said second clutch and to aid rapid disengagement of said first clutch.

3. A two-speed clutch drive, comprising in combination, a frame, first and second inputs and an output therebetween journaled on said frame, first and second multiple disc clutches, each comprising first and second sets of discs, means mounting said first set of clutch discs of said first clutch rotationally fixed and axially slidable relative to said first input, means mounting said first set of clutch discs of said second clutch rotationally fixed and axially slidable relative to said second input, means mounting said second sets of clutch discs rotationally fixed and axially slidable relative to said clutch output, said last named means comprising a composite shifter plate having first and second magnetic disc members on opposite sides of a nonmagnetic plate, and first and second clutch coils fixed on said frame on opposite sides of said clutch output, whereby flux from said first coil links said first magnetic disc plus the first and second sets of clutch discs of said first clutch to urge same into frictional engagement, and whereby substantially simultaneous de-energization of said first coil and energization of said second coil establishes a flux path from said second coil linking said second magnetic disc plus the first and second sets of clutch discs of said second clutch to axially move said composite shifter plate toward said second coil to engage said second clutch and to aid rapid disengagement of said first clutch.

4. A two-speed clutch drive, comprising in combination, a frame, an output shaft journaled on said frame, a clutch output sleeve fixed to said output shaft intermediate the ends thereof, a first input gear journaled on one side of said output sleeve on said shaft, a second input gear journaled on said shaft on the other side of said output sleeve, first and second multiple disc clutches, each comprising first and second sets of discs, means mounting said first set of clutch discs of said first clutch rotationally fixed and axially slidable relative to said first gear, means mounting said first set of clutch discs of said second clutch rotationally fixed and axially slidable relative to said second gear, means mounting said second sets of clutch discs rotationally fixed and axially slidable relative to said clutch output sleeve, said last named means comprising a composite shifter plate having first and second magnetic disc members on opposite sides of a non-magnetic plate, and first and second clutch coils fixed on said frame on opposite sides of said clutch output sleeve, whereby flux from said first coil links said first magnetic disc plus the first and second sets of clutch discs of said first clutch to urge same into frictional engagement, and whereby substantially simultaneous de-energization of said first coil and energization of said second coil establishes a flux path from said second coil linking said second magnetic disc plus the first and second sets of clutch discs of said second clutch to axially move said composite shifter plate toward said second coil to engage said second clutch and to aid rapid disengagement of said first clutch.

5. A two-speed opposed clutch drive, comprising in combination, a frame, an output shaft journaled on said frame, clutch output sleeve fixed to said output shaft intermediate the ends thereof, a first input sleeve journaled on one side of said output sleeve on said shaft, a second input sleeve journaled on said shaft on the other side of said output sleeve, a first high speed input gear fixed to said first input sleeve, a second low speed input gear fixed to said second input sleeve, first and second multiple disc clutches, each comprising first and second sets of discs, means mounting said first set of clutch discs of said first clutch on said first input sleeve fixed rotationally therewith and axially slidable, means mounting said first set of clutch discs of said second clutch rotationally fixed on said second input sleeve and axially slidable, means mounting said second sets of clutch discs rotationally fixed and axially slidable to said clutch output sleeve, said last named means comprising a composite shifter plate splined to said output sleeve and having first and second magnetic disc members on opposite sides of a non-magnetic plate, and first and second clutch coils fixed on said frame on opposite sides of said clutch output sleeve, whereby flux from the first coil links said first magnetic disc plus the first and second sets of clutch discs of said first clutch to urge same into frictional engagement, and whereby substantially simultaneous de-energization of said first coil and energization of said second coil establishes a flux path from said second coil linking said second magnetic disc plus the first and second sets of clutch discs of said second clutch to axially move said composite shifter plate toward said second coil to engage said second clutch and to aid rapid disengagement of said first clutch.

References Cited in the file of this patent

UNITED STATES PATENTS

| 1,899,829 | Sarazin | Feb. 28, 1933 |
| 2,595,190 | Edwards | Apr. 29, 1952 |
| 2,862,590 | Schuman | Dec. 2, 1958 |
| 2,872,003 | Nussbaumer | Feb. 3, 1959 |
| 2,936,642 | Greenhalf | May 17, 1960 |

FOREIGN PATENTS

| 710,106 | Germany | Sept. 4, 1941 |